United States Patent
Chen et al.

(10) Patent No.: US 11,620,835 B2
(45) Date of Patent: Apr. 4, 2023

(54) OBSTACLE RECOGNITION METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Ren Chen, Shenzhen (CN); Yinjian Sun, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 323 days.

(21) Appl. No.: 17/089,062

(22) Filed: Nov. 4, 2020

(65) Prior Publication Data

US 2021/0056324 A1 Feb. 25, 2021

Related U.S. Application Data

(63) Continuation of application No. PCT/CN2019/110082, filed on Oct. 9, 2019.

(30) Foreign Application Priority Data

Oct. 24, 2018 (CN) .......................... 201811245582.4

(51) Int. Cl.
*G06V 20/58* (2022.01)
*G06T 7/70* (2017.01)
(Continued)

(52) U.S. Cl.
CPC .......... *G06V 20/58* (2022.01); *G06K 9/6256* (2013.01); *G06N 3/0454* (2013.01); *G06T 7/70* (2017.01);
(Continued)

(58) Field of Classification Search
None
See application file for complete search history.

(56) References Cited

U.S. PATENT DOCUMENTS

2017/0213093 A1 7/2017 Li et al.
2019/0291723 A1* 9/2019 Srivatsa ................. G06K 9/627
(Continued)

FOREIGN PATENT DOCUMENTS

CN 106707293 A 5/2017
CN 108038433 A 5/2018
(Continued)

OTHER PUBLICATIONS

Chen et al ("Multi-View 3D Object Detection Network for Autonomous Driving", Proceedings of the IEEE Conference on Computer Vision and Pattern Recognition (CVPR), 2017, pp. 1907-1915) (Year: 2017).*

(Continued)

*Primary Examiner* — Leon Viet Q Nguyen
(74) *Attorney, Agent, or Firm* — Crowell & Moring LLP

(57) ABSTRACT

The present disclosure describes a method, an apparatus, and a storage medium for recognizing an obstacle. The method includes acquiring, by a device, point cloud data obtained by scanning surroundings of a target vehicle by a sensor in the target vehicle. The device includes a memory storing instructions and a processor in communication with the memory. The method further includes converting, by the device, the point cloud data into a first image used for showing the surroundings; and recognizing, by the device, from the first image, a first object in the surroundings as an obstacle through a first neural network model.

14 Claims, 8 Drawing Sheets

(51) Int. Cl.
*G06K 9/62* (2022.01)
*G06N 3/04* (2023.01)
*G06V 10/145* (2022.01)
*G06V 10/20* (2022.01)

(52) U.S. Cl.
CPC .......... *G06V 10/145* (2022.01); *G06V 10/255* (2022.01); *G06T 2207/10028* (2013.01); *G06T 2207/30261* (2013.01); *G06V 2201/07* (2022.01)

(56) References Cited

U.S. PATENT DOCUMENTS

| | | | |
|---|---|---|---|
| 2020/0081448 A1* | 3/2020 | Creusot | G06V 10/82 |
| 2021/0019536 A1* | 1/2021 | Motoyama | G06V 20/588 |
| 2021/0019860 A1* | 1/2021 | Arai | G06V 20/58 |

FOREIGN PATENT DOCUMENTS

| | | |
|---|---|---|
| CN | 108229366 A | 6/2018 |
| CN | 108509820 A | 9/2018 |
| CN | 108509918 A | 9/2018 |
| CN | 110147706 A | 8/2019 |

OTHER PUBLICATIONS

Chen Xiaozhi et al., "Multi-view 3D Object Detection Network for Autonomous Driving," 2017 IEEE Conference on Computer Vision and Pattern Recognition (Cvpr), Ieee Computer Society, US, Jul. 21, 2017, pp. 6526-6534.

Bo Li et al., "Vehicle Detection from 3D Lidar Using Fully Convolutional Network," Arxiv.Org, Cornell University Library, 201 Olin Library Cornell University Ithaca, NY, Aug. 29, 2016, 8 pages.

Wu Bichen et al., "SqueezeSeg: Convolutional Neural Nets with Recurrent CRF for Real-Time Road-Object Segmentation from 3D LiDAR Point Cloud," 2018 IEEE International Conference on Robotics and Automation (ICRA), IEEE, May 21, 21, 2018, pp. 1887-1893.

Zhao Jianhui et al., "Object Detection Based on Hierarchical Multi-view Proposal Network for Autonomous Driving," 2018 International Joint Conference on Neural Networks (IJCNN), IEEE, Jul. 8, 2018, pp. 1-6.

Extended European Search Report regarding PCT/CN2019/110082 dated Nov. 18, 2021.

International Search Report with English Translation and Written Opinion regarding PCT/CN2019/110082 dated Jan. 7, 2020, 12 pages.

Chinese Office Action with English concise translation regarding 201811245582.4 dated Dec. 22, 2021, 9 pages.

* cited by examiner

OBSTACLE RECOGNITION METHOD AND APPARATUS, STORAGE MEDIUM, AND ELECTRONIC DEVICE

RELATED APPLICATION

This application is a continuation application of PCT Patent Application No. PCT/CN2019/110082, filed on Oct. 9, 2019, which claims priority to Chinese Patent Application No. 201811245582.4, filed with the National Intellectual Property Administration, PRC on Oct. 24, 2018, both of which are incorporated herein by reference in their entireties.

FIELD OF THE TECHNOLOGY

This application relates to the field of self-piloting, and in particular, to obstacle recognition.

BACKGROUND OF THE APPLICATION

Autonomous vehicle (or self-piloting automobile), also referred to as driverless vehicle, computer driven vehicle, or wheeled mobile robot, is a type of intelligent vehicle that realizes driverless driving by using a computer system. The autonomous vehicle has been developed for decades in the $20^{th}$ century and tends to reach a practical level in the early $21^{st}$ century.

There are some issues and/or problems with autonomous vehicle with high efficiency, for example but not limited to, relatively low accuracy of obstacle recognition.

The present disclosure describes various embodiments, addressing at least some the problems/issues discussed above.

SUMMARY

Embodiments of this application provide an obstacle recognition method and apparatus, a storage medium, and an electronic device, to resolve at least the technical problem of relatively low accuracy of obstacle recognition in the related art.

The present disclosure describes a method for recognizing an obstacle. The method includes acquiring, by a device, point cloud data obtained by scanning surroundings of a target vehicle by a sensor in the target vehicle. The device includes a memory storing instructions and a processor in communication with the memory. The method further includes converting, by the device, the point cloud data into a first image used for showing the surroundings; and recognizing, by the device, from the first image, a first object in the surroundings as an obstacle through a first neural network model.

The present disclosure describes an apparatus for recognizing an obstacle. The apparatus includes a memory storing instructions; and a processor in communication with the memory. When the processor executes the instructions, the processor is configured to cause the apparatus to: acquire point cloud data obtained by scanning surroundings of a target vehicle by a sensor in the target vehicle, convert the point cloud data into a first image used for showing the surroundings, and recognize from the first image, a first object in the surroundings as an obstacle through a first neural network model.

The present disclosure describes a non-transitory computer readable storage medium storing computer readable instructions. The computer readable instructions, when executed by a processor, are configured to cause the processor to perform: acquiring point cloud data obtained by scanning surroundings of a target vehicle by a sensor in the target vehicle; converting the point cloud data into a first image used for showing the surroundings; and recognizing from the first image, a first object in the surroundings as an obstacle through a first neural network model.

According to one aspect of the embodiments of this application, an obstacle recognition method is provided, including: acquiring point cloud data in a process of self-driving of a target vehicle, the point cloud data being obtained by scanning a traveling environment of the target vehicle by a sensor in the target vehicle; converting the point cloud data into a first image used for showing the traveling environment; and recognizing, from the first image, a first object in the traveling environment through a first neural network model.

According to another aspect of the embodiments of this application, an obstacle recognition apparatus is further provided, including: an acquisition unit, configured to acquire point cloud data in a process of self-driving of a target vehicle, the point cloud data being obtained by scanning a traveling environment of the target vehicle by a sensor in the target vehicle; a conversion unit, configured to convert the point cloud data into a first image used for showing the traveling environment; and a recognition unit, configured to recognize, from the first image, a first object in the traveling environment through a first neural network model, the first neural network model being obtained by training a second neural network model by using a second image marked with a second object, the first object and the second object being movable obstacles.

According to another aspect of the embodiments of this application, a storage medium is further provided. The storage medium includes a program stored therein, the program, when run, performing the foregoing method.

According to another aspect of the embodiments of this application, an electronic device is further provided, including a memory, a processor, and a computer program that is stored in the memory and executable on the processor, the processor performing the foregoing method by using the computer program.

According to another aspect of the embodiments of this application, a computer program product including instructions is further provided, the computer program product, when run on a computer, causing the computer to perform the foregoing method.

In the embodiments of this application, in a process of self-driving of a target vehicle, point cloud data is acquired, the point cloud data is converted into a first image used for showing a traveling environment, and a first object in the traveling environment is recognized from the first image through a first neural network model. During processing, recognition can be performed on an obstacle in an image by using a neural network model by using features of the obstacle learned in advance, so that the technical problem of relatively low accuracy of obstacle recognition in the related art can be resolved and the accuracy of obstacle recognition can be improved.

BRIEF DESCRIPTION OF THE DRAWINGS

The accompanying drawings described herein are used for providing further understanding of this application, and form a part of this application. Exemplary embodiments of this application and descriptions thereof are used for explaining this application, and do not constitute any inappropriate limitation to this application. In the drawings.

DESCRIPTION OF EMBODIMENTS

Figure 1:
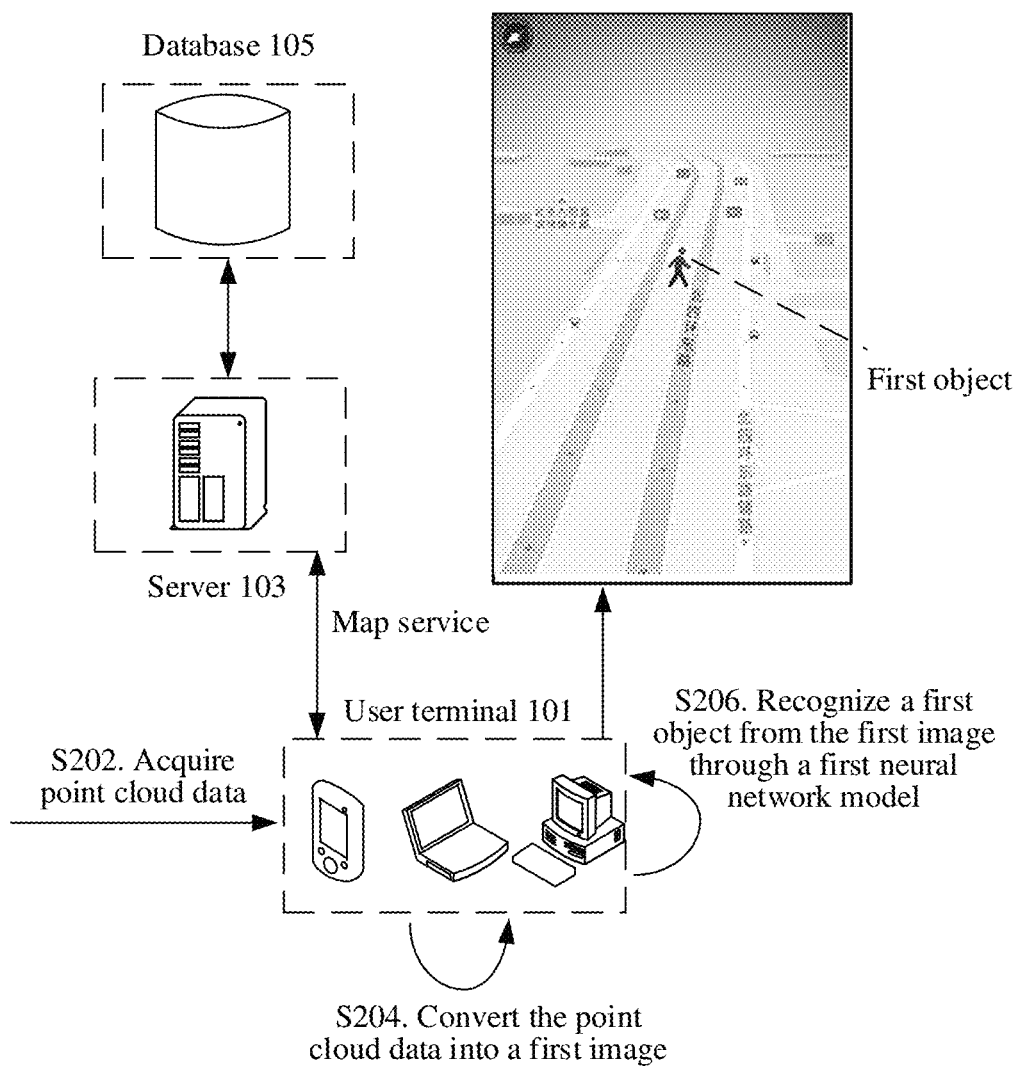
FIG. 1 is a schematic diagram of a hardware environment of an obstacle recognition method according to an embodiment of this application.

To make a person skilled in the art better understand solutions of this application, the following clearly and completely describes the technical solutions in embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

The terms such as "first" and "second" in the specification, the claims and the foregoing accompanying drawings of this application are intended to distinguish between similar objects, but are not necessarily used for describing a specific sequence or a chronological order. It is to be understood that the data termed in such a way are interchangeable in proper circumstances, so that the embodiments of this application described herein can be implemented in orders other than the order illustrated or described herein. Moreover, the terms "include", "contain" and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

First, some nouns or terms that appear during descriptions of the embodiments of this application are applicable to the following explanations:

Autonomous vehicle, also referred to as driverless vehicle, computer driven vehicle, or wheeled mobile robot, is a type of intelligent vehicle that realizes driverless driving by using a computer system. The autonomous vehicle, by relying on cooperation of artificial intelligence, visual computing, a radar, a monitoring apparatus, and a global positioning system, may enable a computer to autonomously and safely operate a motor vehicle without any human proactive operation.

Lidar is a radar system that detects features of a target such as a position and a speed by emitting a laser beam. The lidar can acquire related information about an object, for example, parameters such as a distance, an orientation, a height, a speed, a posture, and even a shape of the target, by emitting a sounding signal (laser beam) to the object, comparing a received signal (target echo) reflected by the object with the emitted signal, and performing suitable processing thereon, so as to detect, track, and recognize the object.

Laser point cloud is a set of massive characteristic points on a target surface. When a laser beam hits a surface of an object, a reflected laser may carry information such as an orientation and a distance. If the laser beam scans in a particular track, information about reflected laser points is also recorded when the scanning is performed. Because the scanning is extremely fine, a large number of laser points can be obtained to form laser point cloud. In one implementation, a point cloud may include massive characteristic information for a set of points on a target surface. The characteristic information may include one or more the following information, such as a distance, an orientation, a height, a speed, a posture, and even a shape of a target.

According to a first aspect of the embodiments of this application, a method embodiment of an obstacle recognition method is provided. In the present disclosure, an object (or target) may be an obstacle or a non-obstacle. An obstacle may refer to an object which the intelligent vehicle recognizes that the object needs to be avoided or that the object would impede the driving, movement, or safety of the intelligent vehicle. Obstacles, for example, may include one or more other vehicles on the road, one or more pedestrians on the road, one or more cyclists on the road, and the like (assuming the intelligent vehicle is on the road). Obstacles may also include a combination thereof. A non-obstacle may refer to an object which the intelligent vehicle recognizes that the object does not need to be avoided or that the object would not impede the driving, movement, or safety of the intelligent vehicle. Non-obstacles, for example, may include a signage on a building, one or more other vehicles parked on the driveway, people on the sidewalk, and the like. Non-obstacles may also include a combination thereof. It should be noted that whether an object is an obstacle may also depend on the location or surroundings of the intelligent vehicle. For example, people walking on the sidewalk may be considered as obstacles if the intelligent vehicle is entering or exiting a parking lot.

Optionally, in this embodiment, the obstacle recognition method may be applied to a processing device. The processing device may include a terminal and/or a server. For example, as shown in FIG. 1, in the hardware environment formed by a terminal 101 and/or a server 103, the processing device includes the terminal 101. As shown in FIG. 1, the server 103, connected to the terminal 101 through a network, may be configured to provide a service (for example, a game service, an application service, or a map service) for the terminal or a client installed on the terminal. A database 105 may be disposed on the server or independently of the server, and is used for providing a data storage service for the server 103. The foregoing network includes, but is not limited to, a wide area network, a metropolitan area network, or a local area network, and the terminal 101 is not limited to an in-vehicle PC, a mobile phone, a tablet computer, or the like.

Figure 2:
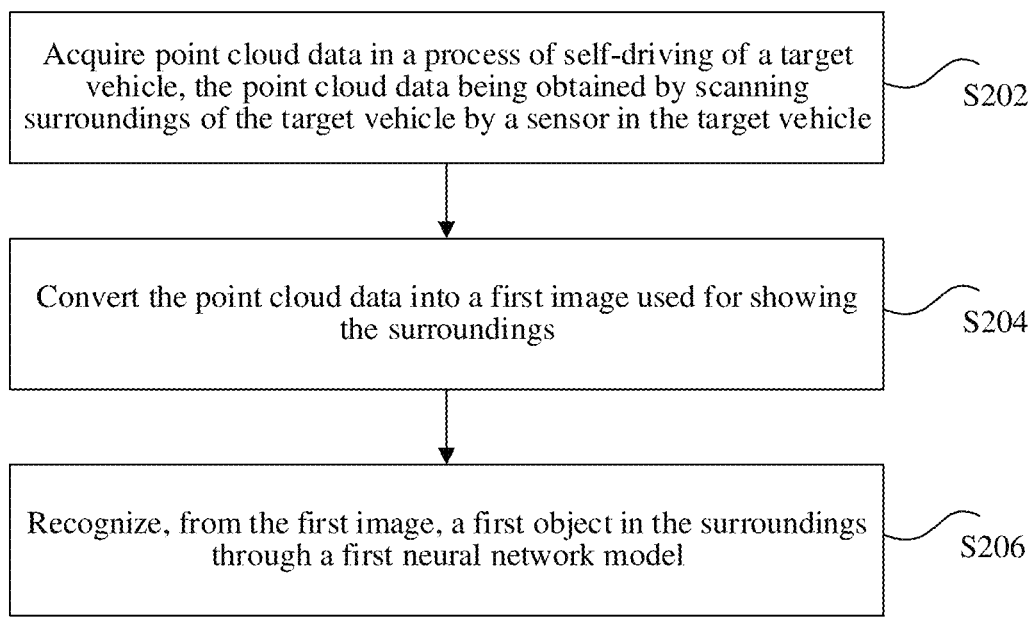
FIG. 2 is a flowchart of an optional obstacle recognition method according to an embodiment of this application.

The obstacle recognition method in this embodiment of this application may be performed by the terminal 101. The obstacle recognition method in this embodiment of this application performed by the terminal 101 may alternatively be performed by a client installed on the terminal. FIG. 2 is a flowchart of an optional obstacle recognition method according to an embodiment of this application. As shown in FIG. 2, the method may include the following steps.

S202. A terminal acquires point cloud data in a process of self-driving of a target vehicle, the point cloud data being obtained by scanning surroundings of the target vehicle by a sensor in the target vehicle. The sensor herein may be a sensor acquiring point cloud data, such as a radar sensor. Surroundings of the target vehicle may be referred to as a traveling environment of the target vehicle, and vice versa.

The foregoing terminal is an intelligent terminal that follows the target vehicle. The terminal may be the vehicle, or a device integrated in or disposed on the vehicle, such as an in-vehicle PC, a mobile phone, a tablet computer, or an in-vehicle navigation device. The target vehicle may be a vehicle that has a self-driving function, such as a full-autonomous vehicle or a semi-autonomous vehicle.

The foregoing point cloud data may be data obtained through scanning by a plurality of laser beams of a lidar sensor. A lidar can obtain features of an object, such as a size and a shape, by using the scanning technology. The lidar may use a rotating motor with good stability and precision. Once a laser beam hits a polygonal prism, the laser beam is reflected by a polygonal prism driven by the rotating motor to form a scanning beam. Because the polygonal prism is on a front focal plane of a scanning lens and uniform rotation causes a continuous change of an incidence angle of a laser beam relative to a reflector, a reflection angle changes continually. Through action of the scanning lens, parallel and uninterrupted scanning rays from top to bottom are formed to be further converted into scanning ray data, that is, a point cloud sequence formed through one-time scanning by a single-layer laser.

The lidar in this application may be a few-layer lidar or a multi-layer lidar. The few-layer lidar can generate fewer scanning rays in one-time scanning. Few-layer products generally include 4-layer lidars, 8-layer lidars, and are mostly 2.5D lidars, with the vertical field of view not greater than 10°; and the multi-layer lidar (or referred to as a 3D lidar) can generate a plurality of scanning rays in one-time scanning. Multi-layer products generally include 16-layer lidars, 32-layer lidars, 64-layer lidars, and the like. The biggest difference between the 3D lidar and the 2.5D lidar lies in that the vertical field of view of the 3D lidar can reach 30° and even a level above 40°. In solutions of this application, a 64-layer lidar may be used for implementing scanning with the 360° horizontal field of view and the approximate 30° vertical field of view S204. The terminal converts the point cloud data into a first image used for showing the surroundings.

If the point cloud data is directly processed, the amount of the to-be-processed data is relatively large (the point cloud data includes information such as a distance, an orientation, a height, a speed, a posture, and even a shape of a target), causing a large calculation amount and a low efficiency. Besides, because there is a relatively big difference between a pedestrian and a rider in terms of form, it is relatively difficult to find a uniform geometric rule for general determining. As a result, it is difficult to reach a relatively high recognition accuracy. In order to improve the data processing efficiency, in this application, the point cloud data is converted into an image during obstacle recognition, and then an obstacle is recognized in a manner of image recognition, reducing consumption of time and hardware caused by data processing and improving the efficiency of data processing. In addition, because a neural network model can build a model and extract an unknown feature and relationship, merely training the neural network model by using a proper picture can implement recognition with a relatively high accuracy without a geometric rule set by human beings. Without human interruption, the impact caused by lack of human experience can be avoided.

S206. The terminal recognizes, from the first image, a first object in the surroundings through a first neural network model.

In a possible implementation, the first neural network model is obtained by training a second neural network model by using a second image marked with a second object, and the first object and the second object are obstacles of the same type. The same type in this embodiment of this application may be the same category. The partition granularity of the type may be related to a scenario or a requirement. For example, in one partition granularity, a pedestrian may belong to one type and a non-motor vehicle may belong to another type. In another partition granularity, a bicycle may belong to one type and a motorbike may belong to another type.

Because one application scenario in this embodiment of this application is object recognition in a driving process of a vehicle, the first object and the second object may further have a feature of mobility apart from the feature of being obstacles belonging to the same type.

For example, an object (for example, the foregoing first object or second object) may be a movable obstacle impeding driving of the target vehicle, such as another vehicle, a person, a bicycle, or an animal.

The obstacle recognition is implemented by using the neural network model in this application. By learning a picture marked with an obstacle, the neural network model can automatically extract, through learning, a mapping relationship between features of an inputted image and outputted data (whether an object is "an obstacle"), adaptively memorize the learned content in a weight value of the network, that is, build a mapping relationship between image features and an obstacle, and further possess a capability of recognizing an obstacle by using the learned mapping relationship.

In the foregoing embodiment, description is provided by using an example in which the obstacle recognition method according to this embodiment of this application is performed by the terminal 101. The obstacle recognition method according to this embodiment of this application may further be performed by the server 103, and the only difference from the foregoing embodiment is that the execution body is changed from the terminal to the server. The obstacle recognition method according to this embodiment of this application may further be jointly performed by the server 103 and the terminal 101, for example, one or two of the steps (such as S202 to S204) are performed by the server 103, and the remaining step (such as S206) is performed by the terminal.

Through the foregoing steps from S202 to S206, in a process of self-driving of a target vehicle, point cloud data is acquired, the point cloud data is converted into a first image used for showing surroundings, and a first object in the surroundings is recognized from the first image through a first neural network model. During processing, recognition can be performed on an obstacle in an image by using a neural network model by using features of the obstacle learned in advance, so that the technical problem of relatively low accuracy of obstacle recognition in the related art can be resolved and the accuracy of obstacle recognition can be improved.

In the technical solutions of this application, three-dimensional laser point cloud is projected on a related view and a relationship between the two is established. According to features of a pedestrian and a rider, the pedestrian and the rider are detected on a front view with the largest image size by using a technology of instance segmentation in computer vision, achieving a relatively good detection effect. Besides, because the size of the front view is relatively small, and calculation time is relatively short, a requirement of real-time on-line perception of self-piloting is met.

The technical solutions of this application may be applied to an advanced driver assistance system (ADAS). The ADAS is an active safety technology in which data of environments in and out of a vehicle is acquired for the first time by using various sensors mounted on the vehicle and technical processing such as discrimination between a static object and a dynamic object, detection, and tracking are performed to enable a driver to perceive a potential danger as quickly as possible and get noticed, thereby improving the safety. The sensors used by the ADAS mainly include a lidar and the like. When the vehicle detects a potential danger, that is, an obstacle is detected by using the technical solutions of this application, the vehicle gives an alarm to warn the driver to notice an abnormal vehicle or road condition, or directly performs self-driving to avoid the detected obstacle. The technical solutions of this application are further described below in detail with reference to steps shown in FIG. 2.

In the technical solution provided in S202, the terminal acquires the point cloud data in a process of self-driving of the first target vehicle, the point cloud data being obtained by scanning the surroundings of the first target vehicle by the radar sensor in the first target vehicle.

The radar sensor in this application may be a lidar sensor, a lidar range-finder, or the like, for example, a Velodyne lidar sensor. In a possible implementation, the radar sensor may be a three-dimensional lidar sensor, for example, an HDL-64E lidar sensor in the Velodyne lidar sensors. The HDL-64E lidar sensor is designed for obstacle detection and navigation of vehicles and marine vessels. Its strength and durability, 360° field of view and high transmission rate make this sensor applicable to 3D mobile data acquisition and mapping applications. With its full 360° horizontal field of view by 26.8° vertical field of view, 5-15 Hz user-selectable frame rate, and output rate of 1.3 million pixels per second, the HDL-64E provides reliable distancing sensing data. The HDL-64E has the advantage of one-piece design and uses 64 lasers that are firmly mounted, steady, and reliable.

In the technical solution provided in S204, the terminal converts the point cloud data into the first image used for showing the surroundings.

Figure 3:
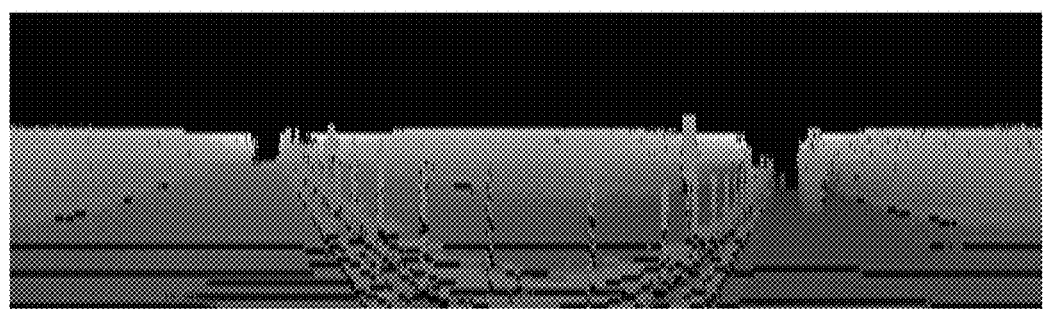
FIG. 3 is a schematic diagram of an optional front view according to an embodiment of this application.

The first image may be a front view of the vehicle. The 64 lasers in the HDL-64E perform 360°-scanning around the surrounding environment, project all laser points that hit a surrounding object after scanning a circle onto a cylindrical surface, and unfold the cylindrical surface into a rectangular shape. In this way, the front view of the laser point cloud is formed, as shown in FIG. 3.

In the foregoing embodiment, the step of converting the point cloud data into a first image used for showing the surroundings may include step 1 and step 2 described in the following.

Step 1. Use the surroundings as a three-dimensional space, a position of the vehicle being an origin, an axis that passes through the origin and the obstacle being an X-axis, an axis that passes through the origin, is perpendicular to the X-axis and in the same plane as the X-axis being a Y-axis, and an axis that passes through the origin and is perpendicular to the horizontal plane being a Z-axis, and determine at least one view of the surroundings according to the point cloud data. The at least one view of the surroundings may include at least one of a distance view, a height view, and an intensity view of the surroundings according to the point cloud data, a pixel value of a pixel point in the distance view being used for indicating a distance between the pixel point and a radar sensor, a pixel value of a pixel point in the height view being used for indicating a height difference between the pixel point and the radar sensor, for example a difference on the Z-axis, a pixel value of a pixel point in the intensity view being used for indicating reflection intensity of the pixel point to a laser scan signal of the radar sensor, for example, if emission intensity is 1, generally, the reflection intensity is greater than or equal to 0, and less than or equal to 1, such as 0.5.

Optionally, the determining the at least one view of a distance view, a height view, and an intensity view of the surroundings according to the point cloud data may be implemented through the following manners:

determining a target cylinder of which the radar sensor is the center, projecting the point cloud data onto the side of the target cylinder, and recording distance information in the point cloud data on the side of the target cylinder and performing picture capturing on the side of the target cylinder to obtain the distance view of the surroundings, that is, unfolding the side of the target cylinder to obtain the distance view; recording height information in the point cloud data on the side of the target cylinder and performing picture capturing on the side of the target cylinder to obtain the height view of the surroundings, that is, unfolding the side of the target cylinder to obtain the height view; and recording reflection intensity information in the point cloud data on the side of the target cylinder and performing picture capturing on the side of the target cylinder to obtain the intensity view of the surroundings, that is, unfolding the side of the target cylinder to obtain the intensity view.

In one embodiment, a distance view, a height view, and an intensity view of the surroundings according to the point cloud data are determined. The combining step discussed in this disclosure may combine all three views into (or to form) the first image, combine at least one of the views with other information into the first image, or combine one or more such views into the first image. Combining the view(s) into the first image may also be referred to as forming a first image using one or more of the determined views.

Step 2. Combine the at least one view into the first image. The at least one view may include at least one of the distance view, the height view, and the intensity view.

Optionally, the combining the at least one view into the first image may be implemented in the following manners: determining the first image by using the pixel value of the pixel point in the distance view as a value of a first channel (for example, an R channel, or referred to as a red channel)

of a pixel point at the same position in the first image, using the pixel value of the pixel point in the height view as a value of a second channel (for example, a G channel, or referred to as a green channel) of a pixel point at the same position in the first image, and using the pixel value of the pixel point in the intensity view as a value of a third channel (for example, a B channel, or referred to as a blue channel) of a pixel point at the same position in the first image.

In the technical solution provided in S206, the terminal recognizes, from the first image, the first object in the surroundings through the first neural network model, the first neural network model being obtained by training the second neural network model by using the second image marked with the second object, the first object and the second object being movable obstacles.

In this embodiment of this application, the recognizing, from the first image, a first object in the surroundings through a first neural network model may include steps from step 1 to step 3 in the following.

Step 1. Use the value of the first channel, the value of the second channel, and the value of the third channel of the first image as an input of the first neural network model.

Optionally, the first image may be transformed into a one-dimensional matrix according to the values of the pixels in channels and positions of the pixels to make it convenient to be inputted into the first neural network model, for example, [an R value of a pixel point 1, a G value of the pixel point 1, a B value of the pixel point 1, an R value of a pixel point 2, a G value of the pixel point 2, a B value of the pixel point 2, . . . , an R value of a pixel point n, a G value of the pixel point n, and a B value of the pixel point n].

Optionally, the first image may be transformed into a one-dimensional matrix according to pixels and channels to make it convenient to be inputted into the first neural network model, for example, [an R value of a pixel point 1, an R value of a pixel point 2, . . . , an R value of a pixel point n, a G value of the pixel point 1, a G value of the pixel point 2, . . . , a G value of the pixel point n, a B value of the pixel point 1, a B value of the pixel point 2, . . . , and a B value of the pixel point n].

Optionally, the first image may be alternatively transformed into a grayscale, with each pixel having a grayscale value. In this way, the grayscale value is used as an input of the first neural network model, for example, [a grayscale value of a pixel point 1, a grayscale value of a pixel point 2, . . . , and a grayscale value of a pixel point n].

Step 2. Perform object recognition on the surroundings in the first image through the first neural network model to obtain the first object, the object recognition including finding, from the surroundings, the first object matching learned features of a movable obstacle.

Optionally, before the recognizing, from the first image, a first object in the surroundings through a first neural network model, the model may be trained in the following manner: training the second neural network model by using the second image in a training set to initialize a weight parameter on each network layer of the second neural network model to obtain a third neural network model; using the third neural network model as the first neural network model in a case that accuracy of recognizing a third object in a picture of a test set by the third neural network model reaches a first threshold (for example, 95%); and continuing training the third neural network model by using the second image in the training set in a case that the accuracy of recognizing the third object in the picture of the test set by the third neural network model does not reach the first threshold, until the accuracy of recognizing the third object in the picture of the test set by the third neural network model reaches the first threshold. In one implementation, "reaching a threshold" may refer to being equal to or larger than the threshold.

The foregoing second image used as the training image may be either a positive training image (or a positive sample) marked with an object that is an obstacle, or a negative training image (or a negative sample) marked with an object that is not an obstacle.

The foregoing second image may be a set of training images, including two parts: a positive training image part including one or more positive sample marked with an object that is an obstacle, and a negative training image part including one or more negative sample marked with an object that is not an obstacle. Through the two types of samples, the neural network model can possess a capability of discriminating an obstacle.

Figure 4:
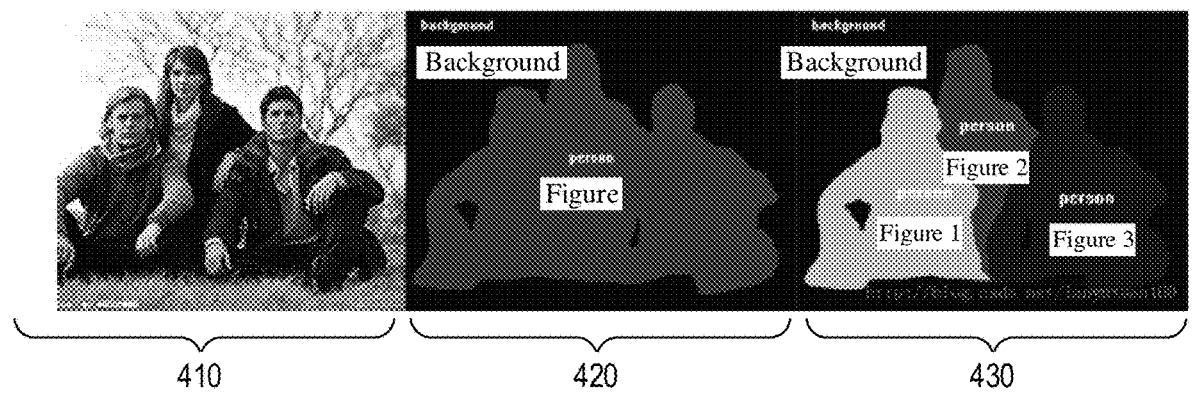
FIG. 4 is a schematic diagram of an optional obstacle segmentation according to an embodiment of this application.

A neural network includes at least two convolutional layers. The first convolutional layer is used for semantic segmentation to implement semantic segmentation on a pixel level, which is to determine a corresponding category for each pixel in the image, that is, implement pixel-level classification. There are mainly two categories herein. One is an obstacle category, and the other is a non-obstacle category. The second convolutional layer is used for implementing instance segmentation. In semantic segmentation, a specific object of a category is an instance. The instance segmentation is not only implementation of pixel-level classification, but also discrimination of different instances based on a specific category. Refer to FIG. 4 for specific differences.

Using FIG. 4 as an example, the image on the left (410), that is, a to-be-recognized image, is used as an input, the image in the middle (420) is an image obtained after the semantic segmentation is implemented, that is, figures are separated from the background, and the image on the right (430) is an image obtained after the instance segmentation is implemented, that is, recognition and segmentation of individual figures are implemented.

Step 3. Acquire an output result that is outputted by the first neural network model and that is used for representing the first object.

Optionally, after the recognizing, from the first image, a first object in the surroundings through a first neural network model, a pixel value of a pixel point in the distance view at a position the same as a position of the first object in the first image is used as a distance between the first object and the target vehicle, and the target vehicle is controlled according to the distance. In another implementation, an average pixel value of one or more pixel point in the distance view for the first object in the first image is used as the distance between the first object and the target vehicle.

The controlling the target vehicle according to the distance includes: controlling the target vehicle to avoid the first object, to avoid colliding with a pedestrian, another vehicle, a rider, or the like in a case that the distance is less than a second threshold (for example, 10 m); and controlling the target vehicle to warn the first object, for example, warn by a horn, light, or the like, in a case that the distance is not less than the second threshold.

In the technical solutions of this application, with reference to a mechanical structure of a lidar and features of a pedestrian and a rider, a correspondence between a three-dimensional space and a front view is established to transfer detection of the pedestrian and the rider from the three-dimensional space to the front view, and the pedestrian and the rider are relatively well detected by using the instance segmentation technology in the computer vision. Therefore, efficient and steady detection and perception of a pedestrian and a rider in a traffic scene of self-piloting are implemented, which is of great significance to the actual release and application of self-piloting.

In an optional embodiment, the following describes the technical solutions of this application in detail with reference to specific implementations.

The lidar, as a core part of perception in self-piloting, is relatively less interfered and can easily adapt to factors such as a light source and weather. Currently, related art such as performing perception and positioning by using the lidar are key factors of implementation of self-piloting. It is of great significance to detect and perceive a pedestrian and a rider who are one of main participants in a traffic scene. During perception of the lidar, detection of the pedestrian, the rider, and the like may be implemented by processing original point cloud data of the lidar.

In the foregoing solution, during detection of the pedestrian and the rider, the HDL-64E lidar generates point cloud data of 120,000 points during scanning of one frame. For the solution of processing original point cloud data of the lidar, because there is a relatively large amount of point cloud data, if the point cloud data is directly processed, it is difficult to meet a requirement of real-time performance. Besides, because the point cloud data is directly analyzed and related feature calculation is involved, the involved algorithm consumes relatively long time, and it is relatively difficult to implement a real-time application unless a perception region is limited. Because the lidar implements recognition by determining a clustered object mainly through feature engineering in which related features and corresponding thresholds are artificially set, and there is a relatively large difference between forms of the pedestrian and the rider in laser point cloud, it is relatively difficult to find the direct and effective features and corresponding thresholds to determine the clustered object, making it difficult to improve the algorithm effect and to implement application in a scenario of self-piloting.

There are few solutions for detecting a pedestrian and a rider in laser point cloud, and the effect is generally not good. According to the foregoing solution, point cloud is clustered in a three-dimensional space, related features such as a normal vector, size information (including length, width, height, and scale information), and a density of a specific object are analyzed, and a specific rule is set to perform determining. However, reflective points of the laser point cloud on a small target such as a pedestrian or a rider are relatively few and corresponding point cloud information only includes geometric information. Therefore, direct processing of the original point cloud causes large calculation amount and low efficiency. In addition, because there is a relatively large difference between forms of the pedestrian and the rider, it is relatively difficult to find a uniform geometric rule for general determining, making it difficult to achieve a better effect by using a general method.

In order to resolve the foregoing problems, this application further provides a technical solution, which is to convert lidar point cloud data into an image for processing, for example, convert elevation information and reflectance information in the point cloud into an image for processing.

The reason why the laser point cloud is converted into a view for processing in this application is that geometric proportions of a pedestrian and rider make an image formed on a top view relatively small in size and a front view is used for processing to make a size of an obstacle such as a pedestrian or a rider relatively large. Processing then is performed on the front view by using related mature technologies such as computer vision. The processing result indicates that the method is relatively quick and effective, and can achieve a better effect of recognizing and detecting a pedestrian and a rider. The following is described with reference to step 1 to step 3.

Step 1. Establish a correlation between a front view and three-dimensional point cloud.

Figure 5:
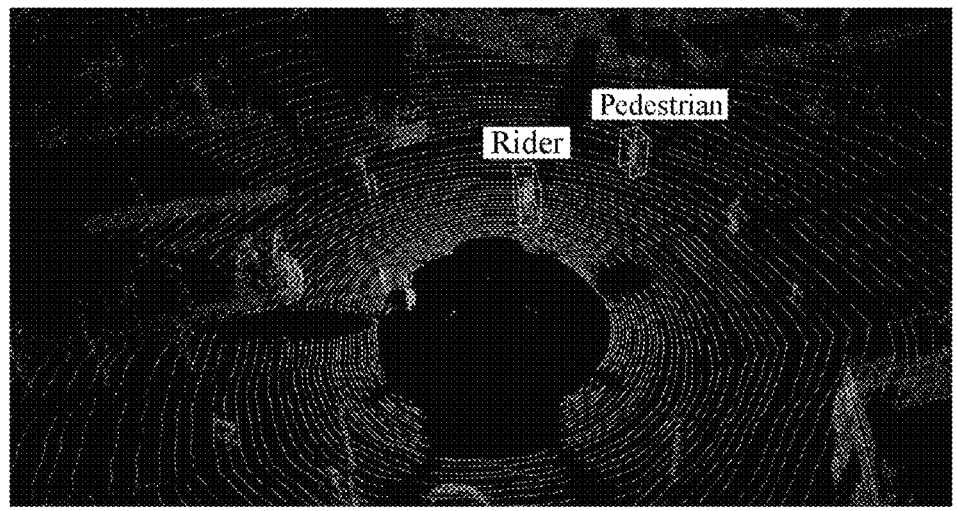
FIG. 5 is a schematic diagram of optional three-dimensional point cloud according to an embodiment of this application.

The front view is selected as a particular perspective according to hardware features of a lidar. Because areas of images that are formed on the front view and that are of a pedestrian and a rider are relatively large and motions of the pedestrian and the rider are relatively slow, it is considered that targets within 40 m of a self-piloting vehicle can meet current perception requirements. Refer to FIG. 5 for specific three-dimensional point cloud of a pedestrian and a rider.

Figure 6:
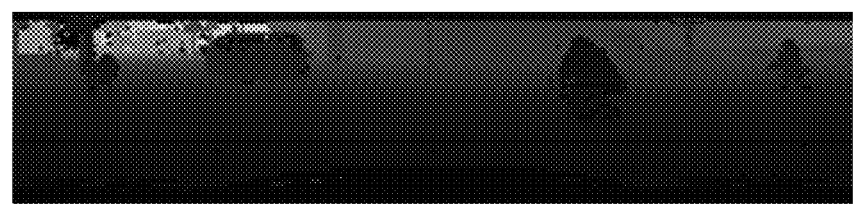
FIG. 6 is a schematic diagram of an optional distance view according to an embodiment of this application.
Figure 7:
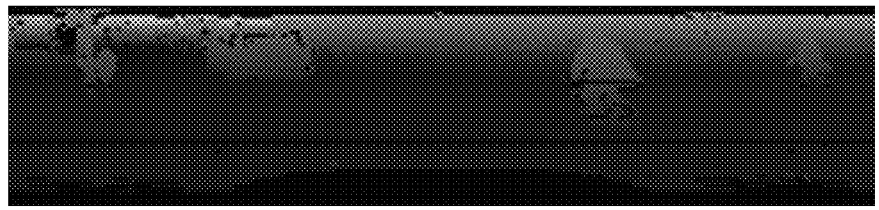
FIG. 7 is a schematic diagram of an optional height view according to an embodiment of this application.
Figure 8:
FIG. 8 is a schematic diagram of an optional intensity view according to an embodiment of this application.

After the three-dimensional point cloud is acquired, various views from the perspective of the front view can be acquired through projection. According to a scan manner of the three-dimensional point cloud, the point cloud can be projected on the side of a cylinder of which a sensor is the central axis, and a partial region of the side is captured from an actual perspective to form a view. A distance between a scan point in the point cloud and the sensor is used as a pixel value of a view to obtain a distance view, as shown in FIG. 6; a height of a scan point in the point cloud is used as a pixel value of a view to obtain a height view, as shown in FIG. 7; and reflection intensity of a scan point in the point cloud is used as a pixel value of a view to obtain an intensity view, as shown in FIG. 8.

Figure 9:
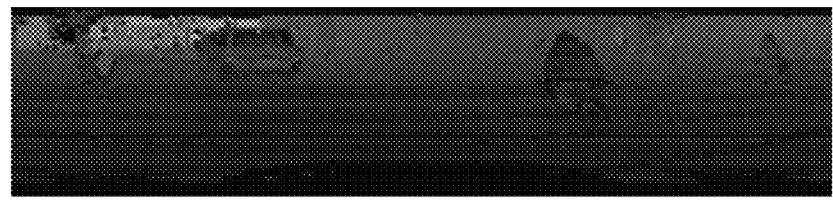
FIG. 9 is a schematic diagram of an optional front view according to an embodiment of this application.

The three views are synthesized into a color image in a manner of image channel encoding, for example, the three views are used as RGB channels of an image respectively to be superposed and combined to form a color image. Refer to FIG. 9 for details.

Step 2. Segment the front view.

It is well acknowledged that an image is formed by a lot of pixels. As the name implies, semantic segmentation is to segment pixels into different groups according to different expressed semantics in an image. The neural network model in this application uses a fully convolutional network (FCN) to directly perform end-to-end semantic segmentation on a pixel level, which can be implemented based on a mainstream deep convolutional neural network (CNN) model. In the FCN, fully-connected layers fc6 and fc7 are both implemented by a convolutional layer, and a final fully-connected layer fc8 is substituted with a 1*1 convolutional layer with M channels to be used as a final output of the network. The reason why there are M channels is that there are M categories included in an obstacle.

Figure 10:
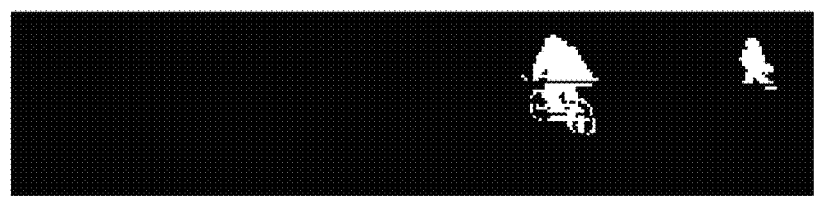
FIG. 10 is a schematic diagram of an optional obstacle segmentation result according to an embodiment of this application.

Image segmentation is performed on the front view by using a deep learning method by using the foregoing FCN, and an image semantic segmentation model is trained based on the FCN to separate an object of interest out. For example, the result is shown in FIG. 10 in which target objects (for example, a pedestrian and a bicycle) are separated out.

Step 3. Project the result of front view segmentation.

Figure 11:
FIG. 11 is a schematic diagram of an optional front view according to an embodiment of this application.

After the front view segmentation, the three-dimensional point cloud may be projected onto an image according to a calibrated relationship between laser images. Refer to FIG. 11 for a result of the projection.

According to the distance information in the distance view of the front view shown in FIG. 9, pixel points of the result of the front view segmentation correspond to scan points in the three-dimensional point cloud. A scan result is re-built and a three-dimensional detection box are drawn in the three-dimensional point cloud. A result of three-dimensional detection is projected back onto the image. Referring to FIG. 11, the result may include a recognized object as a rider 1110, and/or another recognized object as a pedestrian 1120.

By deeply studying a traditional algorithm of converting laser point cloud into an image, with reference to the current mechanical structural features of HDL-64E, and by conducting a related experiment verification on laser point cloud processing in practice, a method of converting laser point cloud into a front view is provided in this application, and in the method, a pedestrian and a rider are detected in the front view by using an instance segmentation algorithm in computer vision. The method implements perception of a pedestrian and a rider in a traffic scene and is of great significance to popularization, release, and application of self-piloting.

For ease of description, the foregoing method embodiments are stated as a series of action combinations. However, a person skilled in the art needs to know that this application is not limited on the sequence of the described actions because according to this application, some steps may use another sequence or may be simultaneously performed. In addition, a person skilled in the art needs to know that, the embodiments described in the specification are all exemplary embodiments and the related actions and modules are not mandatory to this application.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of this application essentially, or the part contributing to the related art may be implemented in a form of a software product. The computer software product is stored in a storage medium (for example, a ROM/RAM, a magnetic disk, or an optical disc), and includes several instructions for instructing a terminal device (which may be a mobile phone, a computer, a server, a network device, or the like) to perform the methods according to the embodiments of this application.

Figure 12:
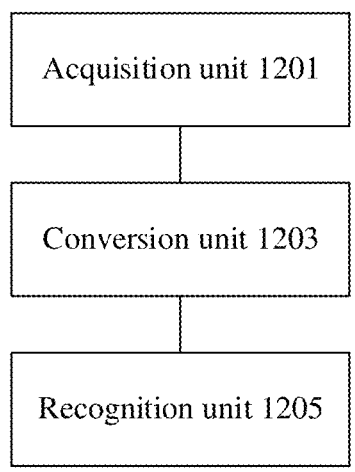
FIG. 12 is a schematic diagram of an optional obstacle recognition apparatus according to an embodiment of this application.

According to another aspect of the embodiments of this application, an obstacle recognition apparatus configured to implement the foregoing obstacle recognition method is further provided. FIG. 12 is a schematic diagram of an optional obstacle recognition apparatus according to an embodiment of this application. As shown in FIG. 12, the apparatus may include:

an acquisition unit 1201, configured to acquire point cloud data in a process of self-driving of a target vehicle, the point cloud data being obtained by scanning surroundings of the target vehicle by a sensor in the target vehicle;

a conversion unit 1203, configured to convert the point cloud data into a first image used for showing the surroundings; and a recognition unit 1205, configured to recognize, from the first image, a first object in the surroundings through a first neural network model, the first neural network model being obtained by training a second neural network model by using a second image marked with a second object, the first object and the second object being movable obstacles.

The acquisition unit 1201 in this embodiment may be configured to perform step S202 in the embodiments of this application, the conversion unit 1203 in this embodiment may be configured to perform step S204 in the embodiments of this application, and the recognition unit 1205 in this embodiment may be configured to perform step S206 in the embodiments of this application.

Examples implemented by the foregoing modules and corresponding steps and application scenarios of the foregoing modules and corresponding steps are the same, but are not limited to the content disclosed in the foregoing embodiments. The foregoing modules may be run in the hardware environment shown in FIG. 1 as a part of the apparatus, and may be implemented by software, or may be implemented by hardware.

Through the foregoing modules, in a process of self-driving of a target vehicle, point cloud data is acquired, the point cloud data is converted into a first image used for showing surroundings, and a first object in the surroundings is recognized from the first image through a first neural network model. During processing, recognition can be performed on an obstacle in an image by using a neural network model by using features of the obstacle learned in advance, so that the technical problem of relatively low accuracy of obstacle recognition in the related art can be resolved and the accuracy of obstacle recognition can be improved.

Optionally, the conversion unit includes a determining module, configured to determine at least one view of a distance view, a height view, and an intensity view of the surroundings according to the point cloud data, a pixel value of a pixel point in the distance view being used for indicating a distance between the pixel point and the sensor, a pixel value of a pixel point in the height view being used for indicating a height difference between the pixel point and the sensor, a pixel value of a pixel point in the intensity view being used for indicating reflection intensity of the pixel point to a scan signal of the sensor; and a combination module, configured to combine the at least one view into the first image.

Optionally, the determining module includes a projection sub-module, configured to project the point cloud data onto a side of a target cylinder, the sensor being the center of the target cylinder; and a picture capturing sub-module, configured to record distance information in the point cloud data on the side of the target cylinder and perform picture capturing on the side of the target cylinder to obtain the distance view of the surroundings; record height information in the point cloud data on the side of the target cylinder and perform picture capturing on the side of the target cylinder to obtain the height view of the surroundings; and record reflection intensity information in the point cloud data on the side of the target cylinder and perform picture capturing on the side of the target cylinder to obtain the intensity view of the surroundings.

Optionally, the combination module may further be configured to determine the first image by using the pixel value of the pixel point in the distance view as a value of a first channel of a pixel point at the same position in the first image, using the pixel value of the pixel point in the height view as a value of a second channel of a pixel point at the same position in the first image, and using the pixel value of the pixel point in the intensity view as a value of a third channel of a pixel point at the same position in the first image.

Optionally, the recognition unit may include an input module, configured to use the value of the first channel, the value of the second channel, and the value of the third channel of the first image as an input of the first neural network model; a recognition module, configured to perform object recognition on the surroundings in the first image through the first neural network model to obtain the first object, the object recognition including recognizing, from the surroundings, the first object matching learned features of a movable obstacle; and an acquisition module, configured to acquire an output result that is outputted by the first neural network model and that is used for representing the first object.

Optionally, the apparatus in this application may further include a training unit, configured to perform, before the recognizing of, from the first image, the first object in the surroundings through the first neural network model, the following operations: training the second neural network model by using the second image in a training set to initialize a weight parameter on each network layer of the second neural network model to obtain a third neural network model; using the third neural network model as the first neural network model in a case that accuracy of recognizing a third object in a picture of a test set by the third neural network model reaches a first threshold; and continuing training the third neural network model by using the second image in the training set in a case that the accuracy of recognizing the third object in the picture of the test set by the third neural network model does not reach the first threshold, until the accuracy of recognizing the third object in the picture of the test set by the third neural network model reaches the first threshold.

Optionally, the apparatus in this application may further include a distance measuring unit, configured to use, after the recognizing of, from the first image, the first object in the surroundings through the first neural network model, a pixel value of a pixel point in the distance view at a position the same as a position of the first object in the first image as a distance between the first object and the target vehicle; and a control unit, configured to control the target vehicle according to the distance.

The control unit may include a first control module, configured to control the target vehicle to avoid the first object, in a case that the distance is less than a second threshold; and a second control module, configured to control the target vehicle to warn the first object in a case that the distance is not less than the second threshold.

The lidar, as a core part of perception in self-piloting, is relatively less interfered and can easily adapt to factors such as a light source and weather. Currently, related art such as performing perception and positioning by using the lidar are key factors of implementation of self-piloting. It is of great significance to detect and perceive a pedestrian and a rider who are one of main participants in a traffic scene. During perception of the lidar, detection of the pedestrian, the rider, and the like may be implemented by processing original point cloud data of the lidar.

In the foregoing solution, during detection of the pedestrian and the rider, the HDL-64E lidar scans 120,000 pieces of point cloud data during scanning of one frame. For the solution of processing original point cloud data of the lidar, because there is a relatively large amount of point cloud data, if the point cloud data is directly processed, it is difficult to meet a requirement of real-time performance. Besides, because the point cloud data is directly analyzed and related feature calculation is involved, the involved algorithm consumes relatively long time, and it is relatively difficult to implement a real-time application unless a perception region is limited. Because the lidar implements recognition by determining a clustered object mainly through feature engineering in which related features and corresponding thresholds are artificially set, and there is a relatively large difference between forms of the pedestrian and the rider in laser point cloud, it is relatively difficult to find the direct and effective features and corresponding thresholds to determine the clustered object, making it difficult to improve the algorithm effect and to implement application in a scenario of self-piloting.

There are few solutions for detecting a pedestrian and a rider in laser point cloud, and the effect is generally not good. According to the foregoing solution, point cloud is clustered in a three-dimensional space, related features such as a normal vector, size information (including length, width, height, and scale information), and a density of a specific object are analyzed, and a specific rule is set to perform determining. However, reflective points of the laser point cloud on a small target such as a pedestrian or a rider are relatively few and corresponding point cloud information only includes geometric information. Therefore, direct processing of the original point cloud causes large calculation amount and low efficiency. In addition, because there is a relatively large difference between forms of the pedestrian and the rider, it is relatively difficult to find a uniform geometric rule for general determining, making it difficult to achieve a better effect by using a general method.

In order to resolve the foregoing problems, this application further provides a technical solution, which is to convert lidar point cloud data into an image for processing, for example, convert elevation information and reflectance information in the point cloud into an image for processing.

The reason why the laser point cloud is converted into a view for processing in this application is that geometric proportions of a pedestrian and rider make an image formed on a top view relatively small in size and a front view is used for processing to make a size of an obstacle such as a pedestrian or a rider relatively large. Processing then is performed on the front view by using related mature technologies such as computer vision. The processing result indicates that the method is relatively quick and effective, and can achieve a better effect of recognizing and detecting a pedestrian and a rider.

Examples implemented by the foregoing modules and corresponding steps and application scenarios of the foregoing modules and corresponding steps are the same, but are not limited to the content disclosed in the foregoing embodiments. The foregoing modules may be run in the hardware environment shown in FIG. 1 as a part of the apparatus, and may be implemented by software, or may be implemented by hardware. The hardware environment includes a network environment.

According to another aspect of the embodiments of this application, a server or a terminal configured to implement the foregoing obstacle recognition method is further provided.

Figure 13:
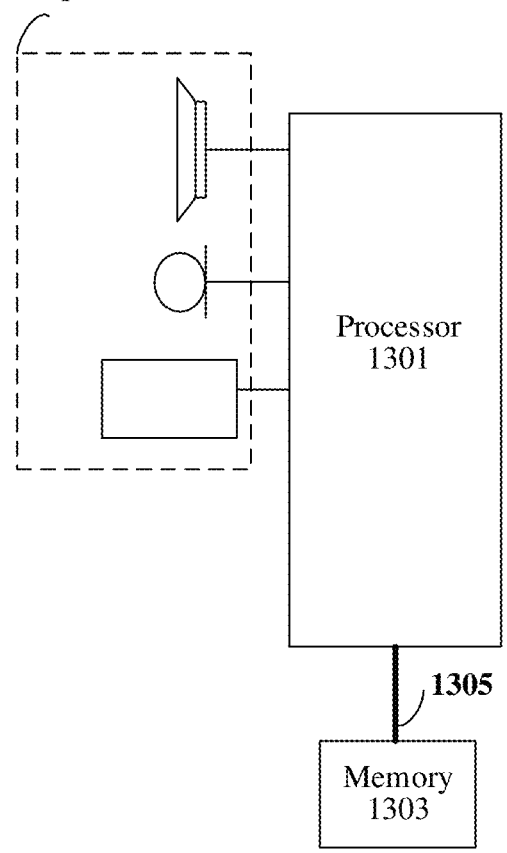
FIG. 13 is structural block diagram of a terminal according to an embodiment of this application.

FIG. 13 is a structural block diagram of a terminal according to an embodiment of this application. As shown in FIG. 13, the terminal may include: one or more processors 1301 (only one is shown in FIG. 13), a memory 1303, and a transmission apparatus 1305. As shown in FIG. 13, the terminal may further include an input/output device 1307.

The memory 1303 can be configured to store a software program and a module, for example, a program instruction/module corresponding to the obstacle recognition method and apparatus in the embodiments of this application, and the processor 1301 performs various functional applications and data processing, that is, implements the foregoing obstacle recognition method, by running the software program and the module stored in the memory 1303. The memory 1303 may include a high-speed random access memory, and may further include a non-volatile memory, for example, one or more magnetic storage devices, flash memories, or other non-volatile solid state memories. In some examples, the memory 1303 may further include memories remotely disposed relative to the processor 1301, and the remote memories may be connected to the terminal through a network. Examples of the network include but are not limited to, the Internet, an intranet, a local area network, a mobile communication network, and a combination thereof.

The transmission apparatus 1305 is configured to receive or send data by using a network, or may further be configured to transmit data between the processor and the memory. Specific examples of the foregoing network may include a wired network and a wireless network. In an example, the transmission apparatus 1305 includes a network interface controller (NIC). The NIC may be connected to another network device and a router by using a network cable, to communicate with the Internet or the local network. In one example, the transmission device 1305 is a radio frequency (RF) module, which is configured to communicate with the Internet in a wireless manner.

Specifically, the memory 1303 is configured to store an application.

The processor 1301 may invoke, by using the transmission apparatus 1305, the application stored in the memory 1303, to perform the following steps:

acquiring point cloud data in a process of self-driving of a target vehicle, the point cloud data being obtained by scanning surroundings of the target vehicle by a sensor in the target vehicle;

converting the point cloud data into a first image used for showing the surroundings; and recognizing, from the first image, a first object in the surroundings through a first neural network model, the first neural network model being obtained by training a second neural network model by using a second image marked with a second object, the first object and the second object being movable obstacles.

The processor 1301 is further configured to perform the following steps:

training the second neural network model by using the second image in a training set to initialize a weight parameter on each network layer of the second neural network model to obtain a third neural network model;

using the third neural network model as the first neural network model in a case that accuracy of recognizing a third object in a picture of a test set by the third neural network model reaches a first threshold; and continuing training the third neural network model by using the second image in the training set in a case that the accuracy of recognizing the third object in the picture of the test set by the third neural network model does not reach the first threshold, until the accuracy of recognizing the third object in the picture of the test set by the third neural network model reaches the first threshold.

In the embodiments of this application, in a process of self-driving of a target vehicle, point cloud data is acquired, the point cloud data is converted into a first image used for showing surroundings, and a first object in the surroundings is recognized from the first image through a first neural network model. During processing, recognition can be performed on an obstacle in an image by using a neural network model by using features of the obstacle learned in advance, so that the technical problem of relatively low accuracy of obstacle recognition in the related art can be resolved and the accuracy of obstacle recognition can be improved.

Optionally, for a specific example in this embodiment, refer to the examples described in the foregoing embodiments. Details are not described herein again in this embodiment.

A person of ordinary skill in the art may understand that the structure shown in FIG. 13 is merely an example, and the terminal may be a terminal device such as a smartphone (for example, an Android mobile phone or an iOS mobile phone), a tablet computer, a palmtop computer, a mobile Internet device (MID), or a PAD. FIG. 13 does not constitute a limitation on the structure of the electronic device. For example, the terminal may further include more or fewer components (for example, a network interface and a display apparatus) than those shown in FIG. 13, or have a configuration different from that shown in FIG. 13.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

An embodiment of this application further provides a storage medium. Optionally, in this embodiment, the storage medium may be configured to store program code for performing the obstacle recognition method.

Optionally, in this embodiment, the storage medium may be located on at least one of a plurality of network devices in the network described in the foregoing embodiment.

Optionally, in this embodiment, the storage medium is configured to store program code for performing the following steps:

S12. Acquire point cloud data in a process of self-driving of a target vehicle, the point cloud data being obtained by scanning surroundings of the target vehicle by a sensor in the target vehicle.

S14. Convert the point cloud data into a first image used for showing the surroundings.

S16. Recognize, from the first image, a first object in the surroundings through a first neural network model, the first neural network model being obtained by training a second neural network model by using a second image marked with a second object, the first object and the second object being movable obstacles.

Optionally, the storage medium is further configured to store program code for performing the following steps:

S22. Train the second neural network model by using the second image in a training set to initialize a weight parameter on each network layer of the second neural network model to obtain a third neural network model.

S24. Use the third neural network model as the first neural network model in a case that accuracy of recognizing a third object in a picture of a test set by the third neural network model reaches a first threshold.

S26. Continue training the third neural network model by using the second image in the training set in a case that the accuracy of recognizing the third object in the picture of the test set by the third neural network model does not reach the first threshold, until the accuracy of recognizing the third object in the picture of the test set by the third neural network model reaches the first threshold.

Optionally, for a specific example in this embodiment, refer to the examples described in the foregoing embodiments. Details are not described herein again in this embodiment.

Optionally, in this embodiment, the storage medium may include, but is not limited to, various media such as a USB flash drive, a ROM, a RAM, a removable hard disk, a magnetic disk, and an optical disc that can store the program code.

An embodiment of this application further provides a computer program product including instructions, the computer program product, when run on a server, causing the server to perform the method according to the foregoing embodiments.

The sequence numbers of the foregoing embodiments of this application are merely for description purpose but do not indicate the preference of the embodiments.

In a case that the integrated unit in the foregoing embodiments is implemented in the form of a software function unit and sold or used as an independent product, the integrated unit can be stored in the foregoing computer-readable storage medium. Based on such an understanding, the technical solutions of this application essentially, or a part contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have their respective focuses. For a part that is not described in detail in an embodiment, refer to related descriptions in other embodiments.

In the several embodiments provided in this application, it is to be understood that, the disclosed client may be implemented in another manner. The described device embodiments are merely exemplary. For example, the unit division is merely logical function division and may be another division in an actual implementation. For example, a plurality of units or components may be combined or integrated into another system, or some features may be ignored or not performed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and the parts displayed as units may or may not be physical units, may be located in one position, or may be distributed on multiple network units. Some or all of the units can be selected according to actual requirements to achieve the objectives of the solutions in the embodiments.

In addition, functional units in the embodiments of this application can be integrated into one processing unit, or each of the units can exist alone physically, or two or more units are integrated into one unit. The foregoing integrated unit can be implemented in the form of hardware, or can be implemented in the form of a software function unit.

The foregoing descriptions are merely exemplary implementations of this application. A person of ordinary skill in the art can further make several improvements and refinements without departing from the principle of this application, and the improvements and refinements shall fall within the protection scope of this application.

What is claimed is:

1. A method for recognizing an obstacle, the method comprising:
    acquiring, by a device comprising a memory storing instructions and a processor in communication with the memory, point cloud data obtained by scanning surroundings of a target vehicle by a sensor in the target vehicle;
    converting, by the device, the point cloud data into a first image used for showing the surroundings; and
    recognizing, by the device, from the first image, a first object in the surroundings as an obstacle through a first neural network model,
    wherein the first neural network model is obtained by:
        training a second neural network model by using a second image in a training set to initialize a weight parameter on a network layer of the second neural network model to obtain a third neural network model,
        in response to accuracy of recognizing a second object in a picture of a test set by the third neural network model being equal to or larger than a first threshold, using the third neural network model as the first neural network model, and
        in response to the accuracy of recognizing the second object in the picture of the test set by the third neural network model being smaller than the first threshold, continuing training the third neural network model by using the second image in the training set, until the accuracy of recognizing the second object in the picture of the test set by the third neural network model reaches the first threshold.

2. The method according to claim 1, wherein the converting, by the device, the point cloud data into the first image used for showing the surroundings comprises:
    determining, by the device, at least one view of a distance view, a height view, and an intensity view of the surroundings according to the point cloud data, a pixel value of a pixel point in the distance view being used for indicating a distance between a point corresponding to the pixel point and the sensor, a pixel value of a pixel point in the height view being used for indicating a height difference between a point corresponding to the pixel point and the sensor, a pixel value of a pixel point in the intensity view being used for indicating reflection intensity of a point corresponding to the pixel point to a scan signal of the sensor; and
    combining, by the device, the at least one view into the first image.

3. The method according to claim 2, wherein the determining, by the device, the at least one view of the distance view, the height view, and the intensity view of the surroundings according to the point cloud data comprises:
    projecting, by the device, the point cloud data onto a side of a target cylinder, the sensor being the center of the target cylinder;
    recording, by the device, distance information in the point cloud data on the side of the target cylinder and performing picture capturing on the side of the target cylinder to obtain the distance view of the surroundings;
    recording, by the device, height information in the point cloud data on the side of the target cylinder and performing picture capturing on the side of the target cylinder to obtain the height view of the surroundings; and
    recording, by the device, reflection intensity information in the point cloud data on the side of the target cylinder and performing picture capturing on the side of the target cylinder to obtain the intensity view of the surroundings.

4. The method according to claim 2, wherein the combining, by the device, the at least one view into the first image comprises:
determining, by the device, the first image by:
using the pixel value of the pixel point in the distance view as a value of a first channel of a pixel point at the same position in the first image,
using the pixel value of the pixel point in the height view as a value of a second channel of a pixel point at the same position in the first image, and
using the pixel value of the pixel point in the intensity view as a value of a third channel of a pixel point at the same position in the first image.

5. The method according to claim 1, wherein after the recognizing, by the device, from the first image, the first object in the surroundings as the obstacle through the first neural network model, the method further comprises:
using, by the device, a pixel value of a pixel point in a distance view at a position the same as a position of the first object in the first image as a distance between the first object and the target vehicle; and
controlling, by the device, the target vehicle according to the distance.

6. An apparatus for recognizing an obstacle, the apparatus comprising:
a memory storing instructions; and
a processor in communication with the memory, wherein, when the processor executes the instructions, the processor is configured to cause the apparatus to:
acquire point cloud data obtained by scanning surroundings of a target vehicle by a sensor in the target vehicle,
convert the point cloud data into a first image used for showing the surroundings, and
recognize from the first image, a first object in the surroundings as an obstacle through a first neural network model,
wherein the first neural network model is obtained by:
training a second neural network model by using a second image in a training set to initialize a weight parameter on a network layer of the second neural network model to obtain a third neural network model,
in response to accuracy of recognizing a second object in a picture of a test set by the third neural network model being equal to or larger than a first threshold, using the third neural network model as the first neural network model, and
in response to the accuracy of recognizing the second object in the picture of the test set by the third neural network model being smaller than the first threshold, continuing training the third neural network model by using the second image in the training set, until the accuracy of recognizing the second object in the picture of the test set by the third neural network model reaches the first threshold.

7. The apparatus according to claim 6, wherein, when the processor is configured to cause the apparatus to convert the point cloud data into the first image used for showing the surroundings, the processor is configured to cause the apparatus to:
determine at least one view of a distance view, a height view, and an intensity view of the surroundings according to the point cloud data, a pixel value of a pixel point in the distance view being used for indicating a distance between a point corresponding to the pixel point and the sensor, a pixel value of a pixel point in the height view being used for indicating a height difference between a point corresponding to the pixel point and the sensor, a pixel value of a pixel point in the intensity view being used for indicating reflection intensity of a point corresponding to the pixel point to a scan signal of the sensor; and
combine the at least one view into the first image.

8. The apparatus according to claim 7, wherein, when the processor is configured to cause the apparatus to determine the at least one view of the distance view, the height view, and the intensity view of the surroundings according to the point cloud data, the processor is configured to cause the apparatus to:
project the point cloud data onto a side of a target cylinder, the sensor being the center of the target cylinder;
record distance information in the point cloud data on the side of the target cylinder and perform picture capturing on the side of the target cylinder to obtain the distance view of the surroundings;
record height information in the point cloud data on the side of the target cylinder and perform picture capturing on the side of the target cylinder to obtain the height view of the surroundings; and
record reflection intensity information in the point cloud data on the side of the target cylinder and perform picture capturing on the side of the target cylinder to obtain the intensity view of the surroundings.

9. The apparatus according to claim 7, wherein, when the processor is configured to cause the apparatus to combine the at least one view into the first image, the processor is configured to cause the apparatus to:
determine the first image by:
using the pixel value of the pixel point in the distance view as a value of a first channel of a pixel point at the same position in the first image,
using the pixel value of the pixel point in the height view as a value of a second channel of a pixel point at the same position in the first image, and
using the pixel value of the pixel point in the intensity view as a value of a third channel of a pixel point at the same position in the first image.

10. The apparatus according to claim 6, wherein, after the processor is configured to cause the apparatus to recognize from the first image, the first object in the surroundings as the obstacle through the first neural network model, the processor is configured to further cause the apparatus to:
use a pixel value of a pixel point in a distance view at a position the same as a position of the first object in the first image as a distance between the first object and the target vehicle; and
control the target vehicle according to the distance.

11. A non-transitory computer readable storage medium storing computer readable instructions, wherein, the computer readable instructions, when executed by a processor, are configured to cause the processor to perform:
acquiring point cloud data obtained by scanning surroundings of a target vehicle by a sensor in the target vehicle;
converting the point cloud data into a first image used for showing the surroundings; and
recognizing from the first image, a first object in the surroundings as an obstacle through a first neural network model,
wherein the first neural network model is obtained by:
training a second neural network model by using a second image in a training set to initialize a weight parameter on a network layer of the second neural network model to obtain a third neural network model, in response to accuracy of recognizing a second object in a picture of a test set by the third neural network model being equal to or larger than a first threshold, using the third neural network model as the first neural network model, and in response to the accuracy of recognizing the second object in the picture of the test set by the third neural network model being smaller than the first threshold, continuing training the third neural network model by using the second image in the training set, until the accuracy of recognizing the second object in the picture of the test set by the third neural network model reaches the first threshold.

12. The non-transitory computer readable storage medium according to claim 11, wherein, when the computer readable instructions are configured to cause the processor to perform converting the point cloud data into the first image used for showing the surroundings, the computer readable instructions are configured to cause the processor to perform:

determining at least one view of a distance view, a height view, and an intensity view of the surroundings according to the point cloud data, a pixel value of a pixel point in the distance view being used for indicating a distance between a point corresponding to the pixel point and the sensor, a pixel value of a pixel point in the height view being used for indicating a height difference between a point corresponding to the pixel point and the sensor, a pixel value of a pixel point in the intensity view being used for indicating reflection intensity of a point corresponding to the pixel point to a scan signal of the sensor; and combining the at least one view into the first image.

13. The non-transitory computer readable storage medium according to claim 12, wherein, when the computer readable instructions are configured to cause the processor to perform determining the at least one view of the distance view, the height view, and the intensity view of the surroundings according to the point cloud data, the computer readable instructions are configured to cause the processor to perform:

projecting the point cloud data onto a side of a target cylinder, the sensor being the center of the target cylinder;

recording distance information in the point cloud data on the side of the target cylinder and performing picture capturing on the side of the target cylinder to obtain the distance view of the surroundings;

recording height information in the point cloud data on the side of the target cylinder and performing picture capturing on the side of the target cylinder to obtain the height view of the surroundings; and recording reflection intensity information in the point cloud data on the side of the target cylinder and performing picture capturing on the side of the target cylinder to obtain the intensity view of the surroundings.

14. The non-transitory computer readable storage medium according to claim 12, wherein, when the computer readable instructions are configured to cause the processor to perform combining the at least one view into the first image, the computer readable instructions are configured to cause the processor to perform:

determining the first image by:

using the pixel value of the pixel point in the distance view as a value of a first channel of a pixel point at the same position in the first image, using the pixel value of the pixel point in the height view as a value of a second channel of a pixel point at the same position in the first image, and using the pixel value of the pixel point in the intensity view as a value of a third channel of a pixel point at the same position in the first image.

* * * * *